United States Patent [19]
McNeill

[11] Patent Number: 4,930,737
[45] Date of Patent: Jun. 5, 1990

[54] ARTICLE RETAINER FOR GLOVE COMPARTMENT

[75] Inventor: Samuel J. McNeill, Redondo Beach, Calif.

[73] Assignee: Fred N. Schwend, Mira Loma, Calif.

[21] Appl. No.: 367,336

[22] Filed: Jun. 16, 1989

[51] Int. Cl.⁵ .............................................. B60R 7/06
[52] U.S. Cl. ............................... 296/37.12; 224/42.42
[58] Field of Search ........................... 296/37.12, 57.1; 224/42.42, 42.34, 42.33, 282, 42.44

[56] References Cited

U.S. PATENT DOCUMENTS

| | | | |
|---|---|---|---|
| 1,498,425 | 6/1924 | Cotton | 224/42.34 X |
| 1,838,344 | 12/1931 | Wilson | 224/42.42 R |
| 2,789,861 | 4/1957 | Hudson | 296/37.12 |
| 3,503,648 | 3/1970 | James | 296/37.12 |
| 4,472,639 | 9/1984 | Bianchi | 296/57.1 |

FOREIGN PATENT DOCUMENTS 284429  2/1928  United Kingdom ............. 224/42.33

Primary Examiner—Margaret A. Focarino
Assistant Examiner—Joseph D. Pape
Attorney, Agent, or Firm—Fred N. Schwend

[57] ABSTRACT

A barrier device for preventing articles stored in a glove compartment of a motor vehicle from falling or rolling out when the compartment door is opened. The barrier device assumes a vertical blocking position when the compartment door is moved to open position but may be collapsed to enable access to the interior of the compartment for removing or inserting articles from and into the compartment.

6 Claims, 1 Drawing Sheet

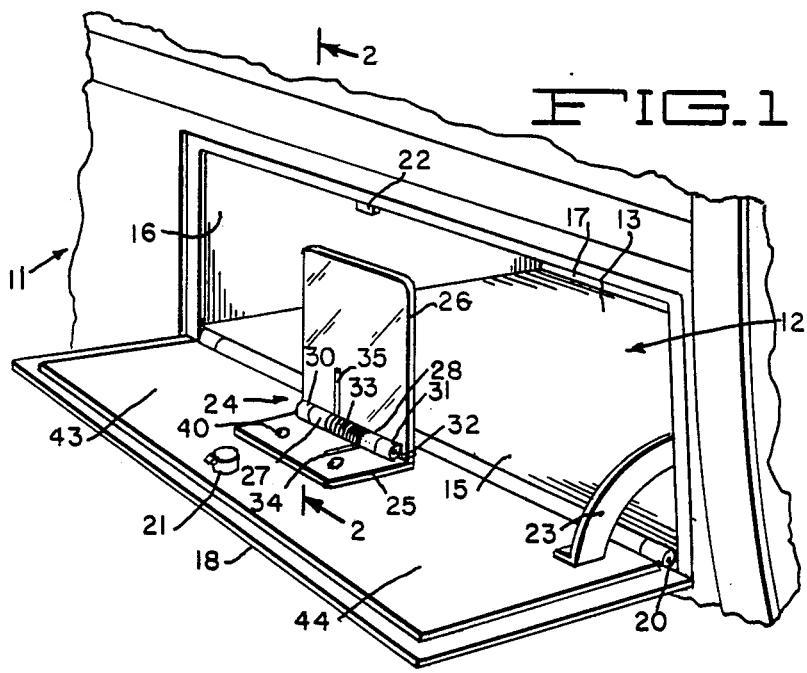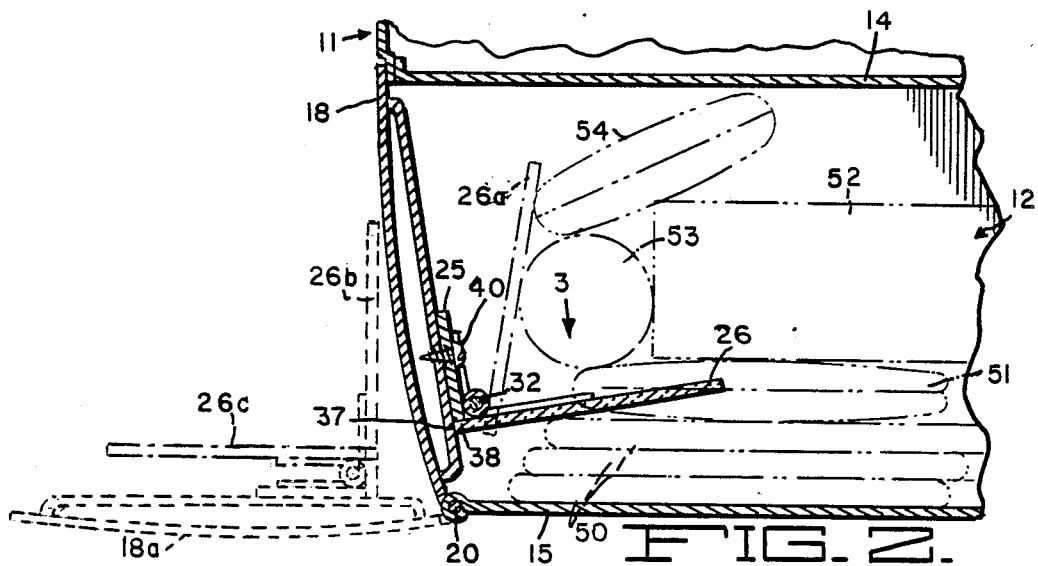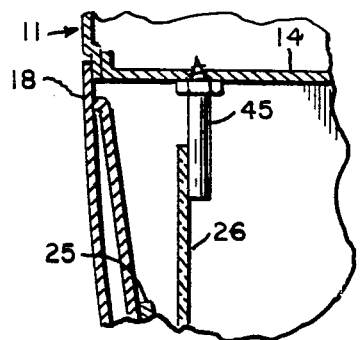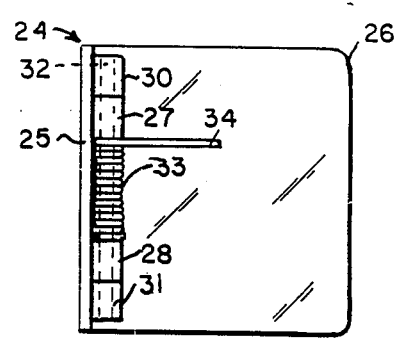

ARTICLE RETAINER FOR GLOVE COMPARTMENT

BACKGROUND OF THE INVENTION

1. Field of the Invention

This invention relates to vehicle storage or glove compartments and has particular reference to means for preventing articles stored in such a compartment from falling or rolling out when the compartment door is opened.

2. Description of the Prior Art

Most motor vehicles comprise a glove compartment accessible through an opening in the instrument panel to store various small articles such as gloves, maps, flashlights, etc.. A door is normally hinged over the compartment and is latched in closed position to prevent the articles from falling or rolling out of the compartment. However, if a large accumulation of articles is stored in the compartment and the door is opened, some of the articles have a tendency to fall or roll out over the opened door and onto the floor. This is particularly true if the vehicle should lurch forward or move over a rough terrain or up a steep incline when the compartment door is opened.

Attempts have been made to overcome the above difficulties by locating the glove compartment in an inclined or vertical position, as disclosed, for example, in the U.S. Pat. No. to F. A. Porsche 3,414,318. However, such an arrangement takes up considerable room and tends to interfere with the knees of a person sitting in the passenger side of the vehicle.

Other designs, as disclosed, for example, in the U.S. Pat. No. 3,386,765, to G. Drach, Jr. comprise a glove compartment which may be swung between open and closed positions. Here also, the compartment takes up considerable room which may interfere with the leg room of a passenger and results in a relatively complicated and expensive construction.

SUMMARY OF THE INVENTION

A principal object if the present invention is to provide a simple and inexpensive barrier device for a vehicle glove compartment which will prevent articles stored within the compartment from falling or rolling out when the compartment door is opened.

Another object is to provide a barrier device of the above type which will not interfere with removal or replacement of articles from or into the compartment.

Another object is to provide a barrier device of the above type which may be easily and readily mounted in existing or new motor vehicles.

Another object is to enable a relatively large number of articles to be stacked in a motor vehicle glove Compartment when the Compartment door is open without the tendency for some of the articles to fall out before the door is closed.

According to the invention, a barrier plate is pivotally supported at its lower end by a glove compartment door for movement about a horizontal axis and is spring urged toward a vertical position when the door is in an open position to retain the articles within the compartment. Also, when the door is closed, the barrier plate yieldably presses against the stored articles tending to move them rearwardly in the compartment and to reduce rattling.

On the other hand, articles may be readily removed from the compartment by manually folding the barrier plate toward the door against the action of the spring means.

BRIEF DESCRIPTION OF THE DRAWINGS

The manner in which the above and other objects of the invention are accomplished will be readily understood on reference to the accompanying drawing when read in conjunction with the following specification, wherein;

FIG. 1 is a fragmentary perspective view of a vehicle instrument panel embodying a preferred form of the present invention, illustrating the glove compartment door in open position.

FIG. 2 is a transverse sectional view taken substantially along line 2—2 of FIG. 1, illustrating the glove compartment door in both open and closed positions.

FIG. 3 is a plan view of the barrier device and is taken in the direction of the arrow 3 in FIG. 2

FIG. 4 is a fragmentary transverse sectional view similar to that of FIG. 2 but illustrating a modified form of the invention.

DESCRIPTION OF THE PREFERRED EMBODIMENT

Referring particularly to FIGS. 1 to 3, a motor vehicle instrument panel is partly shown at 11. A glove compartment generally indicated at 12, is securely mounted in an opening 13 formed in the panel.

The glove compartment is formed by a top wall 14, a bottom wall 15, side walls, one of which is shown at 16, and a rear wall 17.

A compartment door 18 is hinged along its lower end at 20 to the bottom wall 15 for swinging movement from a closed position shown in full lines in FIG. 2 to an open position shown by dotted lines 18a in FIG. 2 and by full lines in FIG. 1.

A suitable latch 21 (FIG. 1) which may be manipulated from the outer side of the door is adapted to latch behind a latching shoulder 22 to normally lock the door in closed position. Upon manipulating the latch, the door may be moved to its open position where it extends in a substantially horizontal plane. This enables such items as refreshments, drinking cups or drinking glasses (not shown) to be set on its upper surface. A suitable limit arm 23 is attached to the door 18 to limit against a suitable stop (not shown) to maintain the door in its horizontal open position.

According to the present invention, a barrier device generally indicated at 24 is provided to retain stored articles within the compartment when the door is opened. Such articles may, for example, include folded maps 50, a wallet 51, a box 52, a flashlight 53, and an eyeglass case 54, all indicated by dot-dot-dash lines.

The barrier device 24 comprises a base plate 25 and a barrier plate 26. Upstanding lugs or projections 27 and 28 on the base plate 25 fit between similar lugs 30 and 31 on the barrier plate and a pivot rod 32 is passed through all lugs to form a pivot connection between the two plates.

A torsion spring 33 is mounted over the rod 32. One end 34 of the spring 33 presses against the base plate and the other end presses against the barrier plate 26 to normally hold the barrier plate approximately at right angles to the base plate wherein the end 37 of the barrier plate limits against the end 38 of the base plate.

The base plate 25 is shown as being secured to the inner side of the door by self tapping screws 40 with the axis of the rod 32 extending horizontally and adjacent the axis of the pivotal support for the compartment door.

Alternatively, the base plate 25 may be secured to the door 18 by a suitable adhesive or by means of a suitable tape having self-adhesive surfaces on opposite sides thereof.

In cases where few if any articles are stored in the glove compartment, the barrier plate will assume its normal position extending at right angles to the general plane of the door 18 when the latter is in closed position, as seen in full lines in FIG. 2. However, when a large number of articles are stored in the compartment, the barrier plate will engage certain of such articles and be deflected toward a collapsed position shown by dot-dash lines 26a against the action of torsion spring 33. The barrier plate will thus tend to push the articles rearward and to hold them in place.

When the door 18 is swung to its open position depicted by the dotted lines 18a of FIG. 2, the barrier plate will assume a vertical position depicted by the dotted lines 26b, thus preventing any of the articles from falling or rolling out of the compartment.

Now, if it is desired to remove or place any articles or into the compartment, the barrier plate may be manually pressed into its collapsed position shown by the dot-dash lines 26c to enable ready access to the interior of the compartment. Upon release of the barrier plate the spring will return the same to its substantially vertical position 26b.

The barrier device may be of any desired width but it is preferably of less width than the width of door 18, leaving spaces at 43 and 44 on the inner side of the door to support items as drinking glasses or cups when the door is in its open position. The plate 26 is preferably transparent.

DESCRIPTION OF THE ALTERNATE EMBODIMENT

FIG. 4 illustrates a modified form of the invention. Elements similar to those shown in FIGS. 1 to 3 are identified by similar reference numerals. Here a guide post 45 is secured to the top wall 14 of the compartment near its openinq into the panel 11 and depends into the path of the plate 26. When the door is moved to closed position, plate 26 will engage post 45 and be guided thereby into its illustrated collapsed position so that it will not press against any of the articles in the compartment.

The barrier device is extremely simple, economical to manufacture and easy to install, and yet is effective to prevent articles stored in the glove compartment from falling or rolling out the compartment when the door 18 is opened. The device is effective even if the vehicle should lurch forward or be parked on a steep incline or be travelling over rough terrain when the door is opened. Also, the compartment can be substantially filled or crammed with articles without the latter falling out when the door is opened.

Obviously, the barrier device can be used in boats, airplanes or other vehicles.

I claim:

1. In combination with a vehicle instrument panel having a storage compartment opening into said panel, a door for said compartment, and means pivotally supporting said door for movement from a generally vertical closed position to a generally horizontal open position;
   a barrier plate,
   means on the inner side of said door pivotally supporting said plate for movement about a horizontal axis,
   stop means for limiting movement of said plate into a first position extending at least substantially at right angles to the general plane of said door, and
   spring means for urging said plate to said first position whereby said plate extends substantially vertical when said door is in said open position,
   said spring means being effective to prevent articles stored in said compartment from moving out of said compartment and deflecting said plate about said axis when said door is moved to open position.

2. In combination with a vehicle instrument panel, a storaqe compartment opening into said panel, a door for said compartment, and means pivotally supporting said door for movement from a generally vertical closed position to a generally horizontal open position;
   a barrier device comprising a base plate,
   means for securing said base plate to the inner side of said door,
   a barrier plate,
   means on said base plate supporting said barrier plate for pivotal movement about a horizontal axis adjacent the lower end of said barrier plate,
   said base plate limiting pivotal movement of said barrier plate to a first position extending at least substantially at right angles to the general plane of said door, and
   spring means for urging said barrier plate to said first position whereby said barrier plate extends substantially vertical when said door is in said open position,
   said spring means being effective to prevent articles stored in said compartment from moving out of said compartment and deflecting said barrier plate about said axis when said door is moved to said open position.

3. The combination as defined in claim 2 wherein said supporting means on said base plate comprises lugs extending from said base plate,
   lugs extending from said barrier plate,
   a pivot rod extending throuqh said lugs whereby to form a pivotal connection between said plates,
   said spring means comprising a torsion spring surrounding said pivot rod,
   one end of said spring engaging said base plate and the other end of said spring engaging said barrier plate.

4. The combination as defined in claim 2 wherein said barrier plate is formed of transparent material.

5. The combination as defined in claim 2 wherein said compartment comprises a top wall,
   a guide element depending from said wall,
   said guide element being engagable by said barrier plate when said door is moved to closed position whereby to limit movement of said barrier plate into said compartment.

6. The combination as defined in claim 2 wherein said barrier plate may be manually deflected outwardly from said compartment and against said spring means when said door is moved to said open position to permit removal of articles from said compartment.

* * * * *